Figure 1:
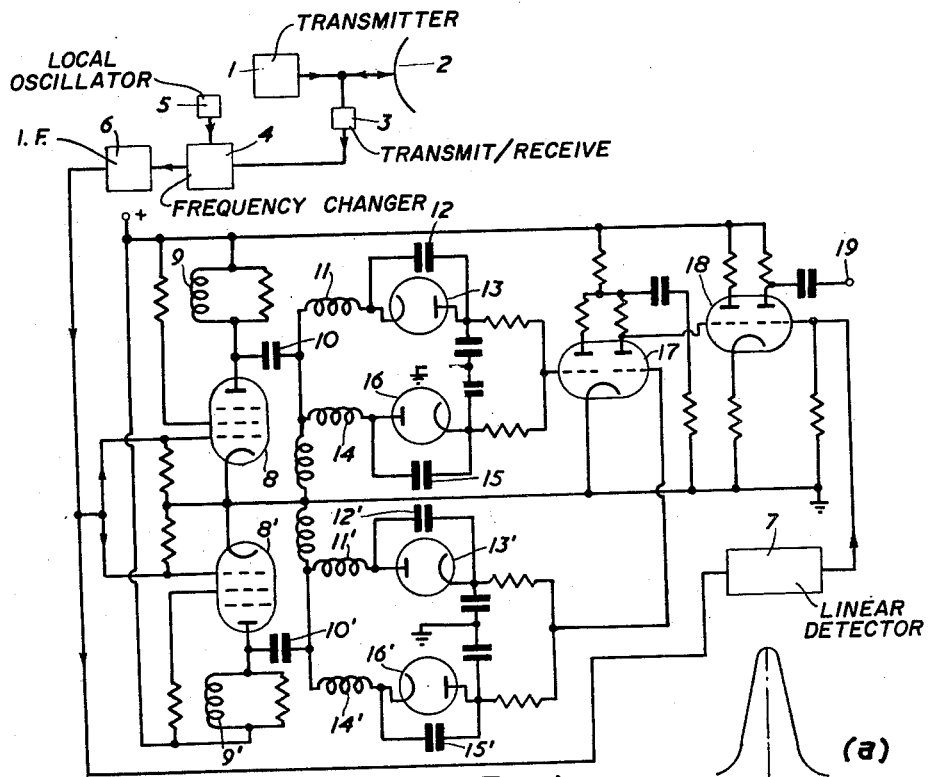

March 17, 1964     P. L. WILLIAMS     3,125,755
SYSTEM TO REDUCE INTERFERENCE IN RADAR PULSE RECEIVERS
Filed Dec. 2, 1958

INVENTOR:
Peter Lionel Williams
BY:
Baldwin & Wight
his ATTORNEYS

United States Patent Office 3,125,755
Patented Mar. 17, 1964

3,125,755
SYSTEM TO REDUCE INTERFERENCE IN RADAR PULSE RECEIVERS
Peter Lionel Williams, Essex, England, assignor to The Marconi Company Limited
Filed Dec. 2, 1958, Ser. No. 777,795
Claims priority, application Great Britain Dec. 9, 1957
3 Claims. (Cl. 343—17.1)

This invention relates to radar stations and has for its object to provide improved and relatively simple radar stations which shall have a good degree of immunity from what is sometimes called "carcinotron jamming." A well known way of jamming or interfering with a conventional radar station is to transmit a continuous wave (C.W.) signal which is frequency modulated to such an extent that it sweeps through a range of frequencies which is considerably greater than the intermediate frequency (I.F.) band width of the I.F. amplifier of the receiver portion of the station. Such a frequency modulated C.W. signal can be conveniently generated by a frequency modulated carcinotron oscillator which is the reason why this form of jamming is sometimes called carcinotron jamming. The result of the reception at the radar station of the jamming oscillations is to produce amplitude modulation at the output of the radar detector due to the selective response of the I.F. receiver amplifier. The radar station thus also responds to carcinotron jamming instead of to echo signals only.

The present invention seeks to provide improved radar stations in which a high degree of immunity from such jamming is obtained in a simple and reliable manner.

According to this invention the receiver portion of a radar station comprises a normal envelope detector fed with a frequency band derived from received signals, a frequency discriminating detector fed with the same band and adapted to provide substantially zero output in response to signals of a frequency equal to the centre frequency of said band, and means for combining the outputs from the two detectors in opposition for utilisation.

According to a feature of this invention the receiver portion of a radar station comprises a normal envelope detector fed with a frequency band derived from received signals, said normal envelope detector having an output amplitude-freqency characteristic which rises from outer band limiting frequencies $f_1$, $f_2$ to a maximum amplitude at a mid-band frequency $f_0$, a frequency discriminating detector fed with the same frequency band, said frequency discriminating detector having an amplitude-frequency characteristic which has maxima at frequencies $f_1$ and $f_2$ and falls away sharply from frequency $f_1$ to frequency $f_0$ and from frequency $f_2$ to frequency $f_0$, giving substantially zero ampltiude at frequency $f_0$, and means for combining the outputs from the two detectors in opposition for utilisation. For practical purposes the frequencies $f_1$ and $f_2$ may be taken as those frequencies which correspond to the −3 db points on the band fed to the two detectors. Normally this band will be the intermediate frequency output band from the normally provided intermediate frequency amplifier of the receiver portion of the station.

Preferably the frequency discriminating detector comprises two valves which may be fed either in push-pull or in parallel each having an anode circuit which is widely tuned to frequency $f_0$ and which feeds two parallel connected rectifying branches one of which is series resonant at $f_2$ and the other is series resonant at $f_1$, and the outputs from each parallel connected pair of rectifying branches (one pair fed from each valve) are combined by feeding the same to one or other of two valves having a common anode output and each responsive to input signals of one and the same polarity.

Figure 2:
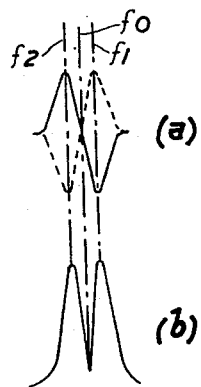
Figure 3:
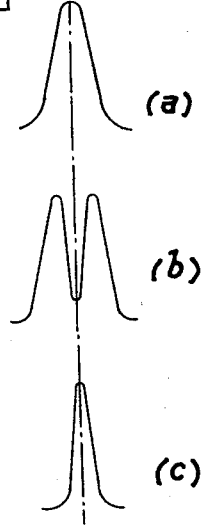

The invention is illustrated in and further explained in connection with the accompanying drawings in which FIGURE 1 is a diagram of one embodiment of the invention and FIGURES 2 and 3 are explanatory graphical figures.

Referring to FIGURE 1, the radar station therein illustrated has a normal pulsetransmitter 1 which transmits pulses from an aerial 2 the received echo pulses at which are fed via a transmit-receive (T.R.) cell or equivalent arrangement 3 to a frequency changer 4 at which the received very high frequency is translated into a predetermined I.F. by means including a local oscillator 5. I.F. output from the frequency changer 4 is amplified by an I.F. amplifier 6 and fed to an ordinary substantially linear envelope detector 7. The station as so far described is in accordance with well known practice and the apparatus so far described being all well known, the units 1, 3, 4, 5, 6 and 7 are represented merely by blocks.

In accordance with this invention there is provided in addition to the normal detector 7 a frequency discriminating detector which is fed in parallel with the normal detector 7 from the I.F. output from the amplifier 6.

The frequency discriminating detector includes two valves 8 and 8' to whose control grids the I.F. signals are fed in parallel. In the anode circuit of each valve 8 or 8' is a resistance shunted inductance 9 or 9' and each anode is connected through a condenser 10 or 10' to a pair of parallel connected rectifying branches. In each case one of the pair of branches includes an inductance 11 or 11' in series with a condenser 12 or 12' across which is a diode 13 or 13' and the other includes an inductance 14 or 14' in series with a condenser 15 or 15' across which is a diode 16 or 16'.

The inductances 9 or 9' are tuned by the condensers 10 or 10' (as the case may be) to be resonant to the central frequency $f_0$ of the I.F. band. The inductance-capacity combinations 11—12 and 11'—12' are tuned to a frequency $f_1$ to one side of the frequency $f_0$ and the combinations 14—15 and 14'—15' are tuned to a frequency $f_2$ equally spaced on the other side of the frequency $f_0$. The frequencies $f_1$ and $f_2$ may in practice be the frequencies corresponding to the −3 db points of the I.F. pass band since, in normal practice, the said −3 db points are regarded as defining the outer limiting frequencies of the band.

The output from the two parallel branches fed from the anode of the valve 8 is passed to one control grid of a double triode 17 and the corresponding output from the other two parallel branches fed from the anode of the valve 8' is fed to the other control grid of this double triode. The two halves of this double triode (which is, of course, equivalent to two valves) are arranged to respond to negative going grid inputs only and, as will be obvious from the circuit, the double triode acts as an adder. The combined output from the valve 17 is fed to one control grid of a further double triode 18 (again equivalent to two valves) whose other control grid is fed with output from the normally provided linear detector 7, the cathode coupled pair of valves 18 being connected as a difference amplifier. Output for utilisation is taken from that anode of the double triode 18 associated with the control grid which is fed from the detector 7 and appears at the output terminal 19 whence it is taken for utilisation and display by any suitable known further apparatus (not shown).

With this arrangeemnt the frequency characteristic of the valve 8 with its associated tuned circuits dimensioned as stated will be in accordance with one or other of the two curves shown at $a$ in FIGURE 2, while the corresponding characteristic of the frequency discriminating circuit arrangement including the valve 8' will be in accordance with the other of the two curves of $a$ of FIGURE 2. For clarity one of these curves is shown dotted and the other in full line. Accordingly the frequency characteristic of the frequency discriminator as measured at that grid of the double triode 18 which is fed from the double triode 17 will be as shown at *b* of FIGURE 2, i.e. it will have a narrow central "cut-out." The frequency characteristic of the normally provided linear detector 7 is as shown at *a* of FIGURE 3, the frequency characteristic at *b* of FIGURE 2 being repeated at *b* of FIGURE 3 for the sake of ready comparison. The double triode 18 combines these two characteristics (at *a* and *b* of FIGURE 3) producing at terminal 19 a characteristic as shown at *c* of FIGURE 3. As will be appreciated the result of the substraction or opposition combination (effected by the valve 18) of the output from the normally provided detector with that from the frequency discriminating detector will be greatly to reduce interference due to carcinotron jamming, leaving only the desired echo signals which are received in the normal manner via detector 7 since substantially no output is obtained through the other channel. If the period in which the jamming frequencies sweep across the intermediate frequency response band of the I.F. amplifier is shorter than the response time of that amplifier—as it commonly will be—the outputs from the two detectors resulting from the jamming frequencies will approximate very closely to one another and a high degree of reduction of jamming will be obtained, but even if the jamming sweep rate is slow so that the sweep period is longer than the I.F. amplifier response time, some anti-jamming improvement will be obtained, though, usually, less than in the former case.

I claim:

1. A radar station the receiver portion of which comprises a normal envelope detector fed with a frequency band derived from received signals, said normal envelope detector having an output amplitude-freqency characteristic which rises from outer band limiting frequencies $f_1$, $f_2$, to a maximum amplitude at a mid-band frequency $f_0$, a frequency discriminating detector fed with the same frequency band, said frequency discriminating detector having an amplitude-frequency characteristic which has maxima at frequencies $f_1$ and $f_2$ and falls sharply from one limiting frequency $f_1$ to mid-band frequency $f_0$ and from the other limiting frequency $f_2$ to frequency $f_0$, giving substantially zero amplitude at frequency $f_0$, a cathode coupled pair of valves connected as a difference amplifier, the output from said normal envelope detector being applied as input to one of said cathode coupled valves and the output from said frequency discriminating detector being fed as input to the other, thereby to provide an output for utilization from said cathode coupled pair of valves substantially representative of the difference between the inputs of each of said pair of valves.

2. A station as claimed in claim 1 wherein the frequency discriminating detector comprises two valves each having two parallel connected rectifying branches one of which is series resonant at $f_2$ and the other is series resonant at $f_1$, and the outputs from each parallel connected pair of rectifying branches, one pair fed from each valve, are combined by feeding the same to one or other of two valves having a common anode output and each responsive to input signals of one and the same polarity.

3. A station as claimed in claim 1 wherein the frequency band $f_1$ to $f_2$ is the intermediate frequency output band from the normally provided intermediate frequency amplifier of the receiver portion of the station.

References Cited in the file of this patent
UNITED STATES PATENTS

| | | |
|---|---|---|
| 2,279,506 | Reid | Apr. 14, 1942 |
| 2,422,513 | Yeandle | June 17, 1947 |
| 2,538,040 | Prichard | Jan. 16, 1951 |
| 2,780,682 | Klein | Feb. 5, 1957 |